US 9,794,344 B2

(12) United States Patent
Lentini et al.

(10) Patent No.: US 9,794,344 B2
(45) Date of Patent: *Oct. 17, 2017

(54) HANDLING OF DATA TRANSFER IN A LAN-FREE ENVIRONMENT

(71) Applicant: International Business Machines Corporation, Armonk, NY (US)

(72) Inventors: Alain Lentini, La Gaude (FR); Jarl Theuwissen, La Gaude (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/996,588

(22) Filed: Jan. 15, 2016

(65) Prior Publication Data

US 2016/0134701 A1 May 12, 2016

Related U.S. Application Data

(63) Continuation of application No. 14/735,858, filed on Jun. 10, 2015, now Pat. No. 9,288,267, which is a (Continued)

(30) Foreign Application Priority Data

Dec. 18, 2009 (EP) .................................... 09306262

(51) Int. Cl.
H04L 29/08 (2006.01)
G06F 11/14 (2006.01)
H04L 29/06 (2006.01)

(52) U.S. Cl.
CPC ...... *H04L 67/1097* (2013.01); *G06F 11/1456* (2013.01); *H04L 69/16* (2013.01); *G06F 2201/815* (2013.01)

(58) Field of Classification Search
CPC .. G06F 11/1456; H04L 67/1097; H04L 69/16; H04L 67/1031; H04L 67/1029; H04L 67/1002
See application file for complete search history.

(56) References Cited

U.S. PATENT DOCUMENTS 6,085,238 A 7/2000 Yuasa et al.
6,098,129 A 8/2000 Fukuzawa et al.
(Continued)

OTHER PUBLICATIONS

"Virtualization of Tape Storage", Cybernetics Intelligent Storage Solutions, 2004, pp. 1-9.
(Continued)

*Primary Examiner* — Khaled Kassim
*Assistant Examiner* — Syed S Ali
(74) *Attorney, Agent, or Firm* — Rabindranath Dutta; Konrad Raynes Davda & Victor LLP (57) ABSTRACT

There is disclosed a method, system and computer readable medium for transferring data in a LAN-free environment, in particular for a tape backup or restore operation. Data of a client partition of a first server is sent to a partition of a LAN-free server through the Local Area Network (LAN). The data sent is then converted from TCP/IP protocol to Fiber Channel protocol. The converted data is sent to a Storage Area Network (SAN) through a Fiber Channel card and finally to a tape library. An advantage is thus to mutualize and virtualize resources, in particular Fiber Channel cards. Storage Area Network tape drives are shared using such host bus adapter cards. Certain embodiments avoid the reconfiguration of Storage Area Network tape drives when the client partition moves to a new hardware.

15 Claims, 5 Drawing Sheets

Related U.S. Application Data continuation of application No. 13/480,198, filed on May 24, 2012, now Pat. No. 9,122,640, which is a continuation of application No. 12/969,329, filed on Dec. 15, 2010, now Pat. No. 8,639,769.

(56) References Cited

U.S. PATENT DOCUMENTS

| | | | |
|---|---|---|---|
| 6,615,327 | B1 | 9/2003 | Satoyama et al. |
| 7,103,638 | B1* | 9/2006 | Borthakur ......... G06F 17/30067 707/999.202 |
| 7,197,662 | B2 | 3/2007 | Bullen et al. |
| 7,251,675 | B1 | 7/2007 | Kamakura et al. |
| 7,406,473 | B1* | 7/2008 | Brassow ........... G06F 17/30067 |
| 7,415,585 | B1 | 8/2008 | Rossi |
| 7,437,477 | B2 | 10/2008 | Kuik et al. |
| 7,444,469 | B2 | 10/2008 | Estelle et al. |
| 7,526,527 | B1 | 4/2009 | Woodruff |
| 7,565,568 | B1 | 7/2009 | Kumar et al. |
| 7,725,940 | B2 | 5/2010 | Kobayashi et al. |
| 8,041,888 | B2 | 10/2011 | Rajan et al. |
| 8,566,542 | B1 | 10/2013 | Wang et al. |
| 8,639,769 | B2 | 1/2014 | Lentini et al. |
| 9,122,640 | B2 | 9/2015 | Lentini et al. |
| 9,237,057 | B1* | 1/2016 | Pittman ............... H04L 67/1097 |
| 2002/0129232 | A1* | 9/2002 | Coffey ....................... G06F 1/24 713/1 |
| 2003/0018927 | A1* | 1/2003 | Gadir ................. G06F 11/2005 714/4.11 |
| 2003/0200478 | A1 | 10/2003 | Anderson |
| 2003/0204597 | A1 | 10/2003 | Arakawa et al. |
| 2003/0225830 | A1 | 12/2003 | Kataoka et al. |
| 2004/0044842 | A1 | 3/2004 | Trimmer et al. |
| 2004/0095950 | A1 | 5/2004 | Shirogane et al. |
| 2004/0153614 | A1 | 8/2004 | Bitner et al. |
| 2004/0225691 | A1 | 11/2004 | Hirao |
| 2005/0021869 | A1 | 1/2005 | Aultman et al. |
| 2005/0021874 | A1 | 1/2005 | Georgiou et al. |
| 2005/0080992 | A1 | 4/2005 | Massey et al. |
| 2005/0102377 | A1 | 5/2005 | King et al. |
| 2005/0108450 | A1 | 5/2005 | Sahara et al. |
| 2005/0188006 | A1 | 8/2005 | Fujibayashi |
| 2005/0216788 | A1 | 9/2005 | Mani-Meitav et al. |
| 2005/0232269 | A1 | 10/2005 | Yao et al. |
| 2005/0267929 | A1* | 12/2005 | Kitamura ................. G06F 3/061 709/201 |
| 2005/0267950 | A1* | 12/2005 | Kitamura ................. G06F 3/061 709/219 |
| 2006/0010227 | A1* | 1/2006 | Atluri ................. G06F 11/1453 709/217 |
| 2006/0015696 | A1 | 1/2006 | Nguyen et al. |
| 2006/0031748 | A1 | 2/2006 | Brady et al. |
| 2006/0242258 | A1 | 10/2006 | Ohtani |
| 2007/0074290 | A1 | 3/2007 | Kobayashi et al. |
| 2007/0112931 | A1 | 5/2007 | Kuik et al. |
| 2007/0186068 | A1 | 8/2007 | Agrawal |
| 2008/0091896 | A1 | 4/2008 | Usami |
| 2008/0250198 | A1 | 10/2008 | Purchase et al. |
| 2008/0263176 | A1 | 10/2008 | Yamagami et al. |
| 2008/0270670 | A1 | 10/2008 | Usami |
| 2009/0013109 | A1 | 1/2009 | Schweig |
| 2009/0049199 | A1 | 2/2009 | Kuik |
| 2009/0150608 | A1 | 6/2009 | Innan et al. |
| 2009/0172326 | A1 | 7/2009 | Sandorfi |
| 2009/0276771 | A1 | 11/2009 | Nickolov et al. |
| 2009/0282203 | A1 | 11/2009 | Haustein et al. |
| 2010/0049726 | A1 | 2/2010 | Yasa et al. |
| 2010/0070725 | A1* | 3/2010 | Prahlad ............... G06F 11/1453 711/162 |
| 2010/0106883 | A1 | 4/2010 | Daniel |
| 2010/0180074 | A1 | 7/2010 | Slater et al. |
| 2010/0281195 | A1 | 11/2010 | Daniel et al. |
| 2011/0099614 | A1 | 4/2011 | Ichikawa et al. |
| 2011/0153730 | A1 | 6/2011 | Lentini et al. |
| 2011/0161527 | A1 | 6/2011 | Wittenschlaeger |
| 2011/0196934 | A1* | 8/2011 | Sheer .................. H04L 67/1002 709/206 |
| 2011/0225303 | A1* | 9/2011 | Engebretson ......... H04L 47/193 709/227 |
| 2012/0233292 | A1 | 9/2012 | Lentini et al. |
| 2015/0281359 | A1 | 10/2015 | Lentini et al. |

OTHER PUBLICATIONS

R. Amatruda, "The Market Opportunity for Enterprise Tape", IDC Information and Data, Dec. 2008, pp. 1-7.
Preliminary Amendment filed Dec. 15, 2010, pp. 1-14 for U.S. Appl. No. 12/969,329, filed Dec. 15, 2010, entitled "Handling of Data Transfer in a Lan-Free Environment".
Preliminary Amendment filed May 24, 2012, pp. 1-5 for U.S. Appl. No. 12/969,329, filed Dec. 15, 2010, entitled "Handling of Data Transfer in a Lan-Free Environment".
Office Action dated Mar. 14, 2013, pp. 1-22, for U.S. Appl. No. 12/969,329, filed Dec. 15, 2010.
Response dated Jun. 14, 2013, pp. 9, to Office Action dated Mar. 14, 2013, pp. 1-22, for U.S. Appl. No. 12/969,329, filed Dec. 15, 2010.
Notice of Allowance dated Sep. 18, 2013, pp. 22, for U.S. Appl. No. 12/969,329, filed Dec. 15, 2010.
Preliminary Remarks filed May 24, 2012, pp. 1-2 for U.S. Appl. No. 12/969,329, filed Dec. 15, 2010.
Office Action dated Jul. 16, 2014, pp. 20, for U.S. Appl. No. 12/969,329, filed Dec. 15, 2010.
Response dated Oct. 16, 2014, pp. 7, to Office Action dated Jul. 16, 2014, pp. 20, for U.S. Appl. No. 12/969,329, filed Dec. 15, 2010.
Notice of Allowance dated Jan. 9, 2015, pp. 19, for U.S. Appl. No. 12/969,329, filed Dec. 15, 2010.
Notice of Allowance2 dated Apr. 23, 2015, pp. 11, for U.S. Appl. No. 12/969,329, filed Dec. 15, 2010.
Notice of Allowance dated Nov. 25, 2015, pp. 24, for U.S. Appl. No. 14/735,858.

* cited by examiner

HANDLING OF DATA TRANSFER IN A LAN-FREE ENVIRONMENT

CROSS-REFERENCE TO RELATED APPLICATIONS

This application is a continuation of U.S. patent application Ser. No. 14/735,858 filed Jun. 10, 2015, wherein U.S. patent application Ser. No. 14/735,858 is a continuation of U.S. patent application Ser. No. 13/480,198 filed May 24, 2012, wherein U.S. patent application Ser. No. 13/480,198 is a continuation of U.S. patent application Ser. No. 12/969,329, filed Dec. 15, 2010, wherein U.S. patent application Ser. No. 14/735,858, U.S. patent application Ser. No. 13/480,198 and U.S. patent application Ser. No. 12/969,329 are incorporated herein by reference in their entirety. U.S. patent application Ser. No. 12/969,329 is a non-provisional application that claims priority benefits under Title 35, United States Code, Section 119(a)-(d) from European (EP) Patent Application entitled "METHOD AND SYSTEM FOR HANDLING DATA TRANSFER IN A LAN-FREE ENVIRONMENT" by Alain Lentini and Jarl Theuwissen, having Patent Application No. EP09306262.8, filed on Dec. 18, 2009, which EP Patent Application is also incorporated herein by reference in its entirety.

BACKGROUND

1. Field

The disclosure relates to data processing, and more particularly to the handling of data transfer in a LAN-free environment.

2. Background

Backup and restore operations pose various issues. In particular, backup on storage tape drives pose specific issues. For example, a same number of backup cards and of partitions may be required. Some existing approaches to solve these issues use particular communications systems between servers of the architecture, other approaches mutualize resources, and still other approaches leverage virtualization mechanisms.

US Patent application 20080091896 entitled "Storage system and data management method" for example discloses a storage system and a data management method which can reduce the load on a virtualization apparatus by executing backup processing or restoration processing within one apparatus in which an externally connected storage apparatus and a tape library apparatus are installed. The storage system includes a virtualization apparatus and an external storage apparatus, wherein the virtualization apparatus comprises an actual volume for storing data sent from a host apparatus, formed in a storage area provided by a physical disk. The virtualization apparatus further comprises a virtual volume paired with the actual volume, for storing replicated data for the data. The external storage apparatus comprises a logical volume that functions as an actual storage area for the virtual volume and a tape associated with the logical volume, for storing the replicated data, wherein the external storage apparatus has a copy unit for copying the replicated data stored in the logical volume to the tape. Whereas this approach leverages a virtualization mechanism, it still presents drawbacks.

During backup and restore operations, the use of the Local Area Network (LAN) may also be highly solicited, leading to a negative impact on the network traffic for existing and active users. For this reason, "LAN-free" backups are increasingly operated. A LAN-free backup is a backup of the data of a server to a shared central storage device without sending the data over the local area network (LAN).

There is a need for a system and method of efficiently managing backup or restore operations and in particular efficient handling of data transfer in a LAN-free environment.

SUMMARY OF THE PREFERRED EMBODIMENTS

In order to address these and other problems, embodiments for handling LAN-free data transfer are provided.

Certain embodiments relate to the usage of tape drives by virtual environments, and more particularly to the efficient connection of a tape drive from a storage area network to a logical partition by using a Virtual LAN provided by a virtual environment.

Certain embodiments provide for the sharing Storage Area Network tape drives using host bus adapter cards with several logical partitions.

Certain embodiments avoid the reconfiguration of Storage Area Network tape drives in the Operating System when the logical partition moves to a new hardware.

An advantage of certain embodiments relate to the sharing of Fibre Channel (FC) technology in the context of LAN-free backup.

An additional advantage of certain embodiments is thus to share resources between several servers.

Yet another advantage is to virtualize a Fibre Channel card between several servers.

Further advantages of certain embodiments will become clear to the skilled person upon examination of the drawings and detailed description. It is intended that any additional advantages be incorporated therein.

BRIEF DESCRIPTION OF THE DRAWINGS

Embodiments of certain aspects of the invention will now be described with reference to the following drawings, in which.

To facilitate description, any numeral identifying an element in one figure will represent the same element in any other figure.

DETAILED DESCRIPTION

The following text presents embodiments in the context of LAN-free backup or restore but it is to be understood that it is not limited to this specific backup or restore context. In particular, the figures and the description discuss a preferred embodiment with the use of IBM pSeries® servers. Further embodiments of the invention are not restricted to these proprietary environments or products, which are provided for exemplary purposes only.

A LAN-free backup is a backup of data from a server to a shared and central storage device. The goal of a LAN-free backup is to reduce the load on LAN and reduce the time required to complete the backup.

Therefore, such a LAN-free backup process often uses a Storage Area Network (SAN). This type of backup offers an alternative way to backup data: this is no more a simple data copy to network-attached storage (NAS) over LAN. There may exist a central backup server arbitrating access to devices (for all the other SAN servers), which does not however handle data stream itself. Without such a backup server, the storage facility (usually a virtual tape library, or VTL) is adapted to handle multiple data accesses without intermediate components.

Fibre Channel (FC), is a gigabit-speed network technology primarily used for storage networking. FC ensures the connection between a computing device and the associated storage device. Fibre Channel is standardized: the ANSI working group X3T11 defines the Fibre Channel specifications. It has become the standard connection type for Storage Area Networks (SAN) in enterprise storage. Fibre Channel signaling can run on both twisted pair copper wire and fibre-optic cables. The Fibre Channel Protocol (FCP) is a transport protocol which predominantly transports SCSI commands over Fibre Channel networks.

Figure 1:
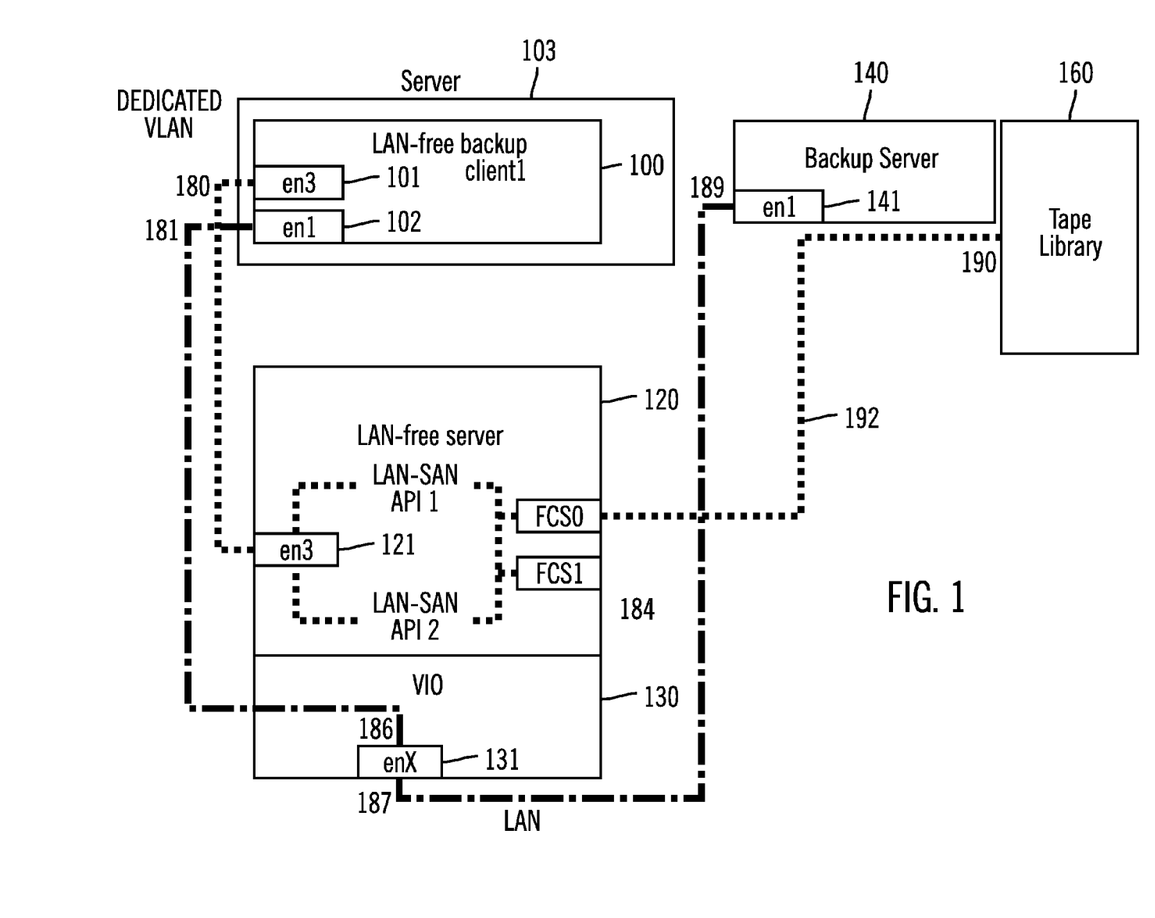
FIG. 1 shows a LAN-free server architecture design for an embodiment of the present invention.

FIG. 1 shows the LAN-free server architecture design. FIG. 1 comprises a logical partition which hosts a LAN-free backup client 100, a LAN-free client virtual Ethernet adapter dedicated to the data backup 101, a virtual Ethernet adapter LAN connectivity 102, a IBM pSeries® physical server 103, a Logical partition 120 that hosts a LAN-free server, a LAN-free server virtual Ethernet adapter 120 dedicated to data backup, LAN-SAN APIs 121 and 122 (the Storage Agent handles the communication with the backup server 140 over the LAN but sends the data directly to SAN attached tape library 160), a Virtual Input Output partition 130, a Virtual Ethernet server adapter 131 which is the interface between virtual Ethernet clients and physical Ethernet LAN, a backup server 140, an Ethernet network adapter 141, a tape library 160, a Virtual LAN 180 dedicated to the data backup, a Virtual LAN 181 dedicated for the network communication, physical interfaces 184 connected to the storage area network to send data to the library, the Local Area Network (LAN) 187, a backup server connection 189 to the Local Area Network (LAN), a tape library connection to the Storage Area Network (SAN) 190 and a Storage Area Network (SAN) 192.

In a typical design of a virtualized architecture, the physical server (IBM pSeries® for example) hosts several partitions 100 with operating systems used for production applications. These operating systems share the same physical resources owned by a specific partition. In FIG. 1 this specific partition is named VIO server 130. In this architecture, the shared resources are used for LAN and SAN data communication. Virtualized structures to the interface between client partitions and the physical interfaces hosted by the VIO partition 130 are required.

FIG. 1 shows the virtualized elements used for network LAN data exchange: the Virtual Ethernet server adapter 131 is the interface between virtual Ethernet clients and physical Ethernet LAN 187. For the production data access used by the client partitions 100, there may be used fibre channel cards owned by the VIO partition 130 and shared between all the client partitions. These virtualizations provide a hardware sharing for LAN and SAN disks access to client partitions.

Certain embodiments of the invention provide a similar virtualization, but specifically for SAN tape sharing between client partitions 100. The virtualization consists in sharing fibre channel hardware cards 184 connected to the SAN which is connected to the tape library. The advantage is thus to use few fibre channel hardware cards and share them instead of installing one or more fibre channel hardware cards on each client partition.

In FIG. 1, the LAN-free server partition can be any of the client partition of the IBM pSeries® server.

In operation, in a first step data is transferred from the client partition 100 to the LAN-free server partition 120 that owns the fibre channel cards and shares them with all client partitions. In certain embodiments, this step is operated using a virtual Ethernet LAN 180 provided by the IBM pSeries® server 103 for example. A virtual LAN, commonly known as a vLAN, has the same attributes as a physical LAN, but defines a logical grouping of networking devices. Network reconfiguration can be operated through software (instead of physically relocating devices). Alternatively to a vLAN, it may be a physical LAN but according to an embodiment, there is a sharing of hardware material instead of assignments of such material to particular tasks.

A second step is the conversion of data coming from virtual LAN 180 to send it to the SAN fibre channel cards 184 to go then to the tape library 160. This conversion is done by a tool currently named "API LAN-SAN" 122. In IBM environments, this API is named "LAN-free storage agent". The API LAN-SAN enables the conversion from TCP (in the TCP/IP stack) into the FC protocol acting as a "gateway". When data are received by the tape library 160, they are written on a set of tapes managed by the tape library. This mechanism can be initiated by a backup of the data owned by one of the client partitions 100 or by a restore of the data of one of client partitions 100. In case of a data backup, pieces of data come from the client partition 100 toward the tape library 160, and in case of a data restore, pieces of data come from the tape library 160 toward one of the client partitions 100.

A backup or a restore of the client data is initiated and managed by one of the backup server 140. To manage this backup or restore operation, the backup server communicates with the client partition. It uses therefore a physical LAN network 187. As the LAN hardware cards are virtualized on the IBM pSeries® server models 103, they are hosted by the VIO partition which shares them between available client partitions 100 via a virtual LAN 181 provided by the IBM pSeries® server 103. A virtual structure, the virtual Ethernet server adapter 131 is used to generate the interface between physical and virtual LAN. During backup or restore operations, the backup server exchanges backup protocol information with the client partition.

Figure 2:
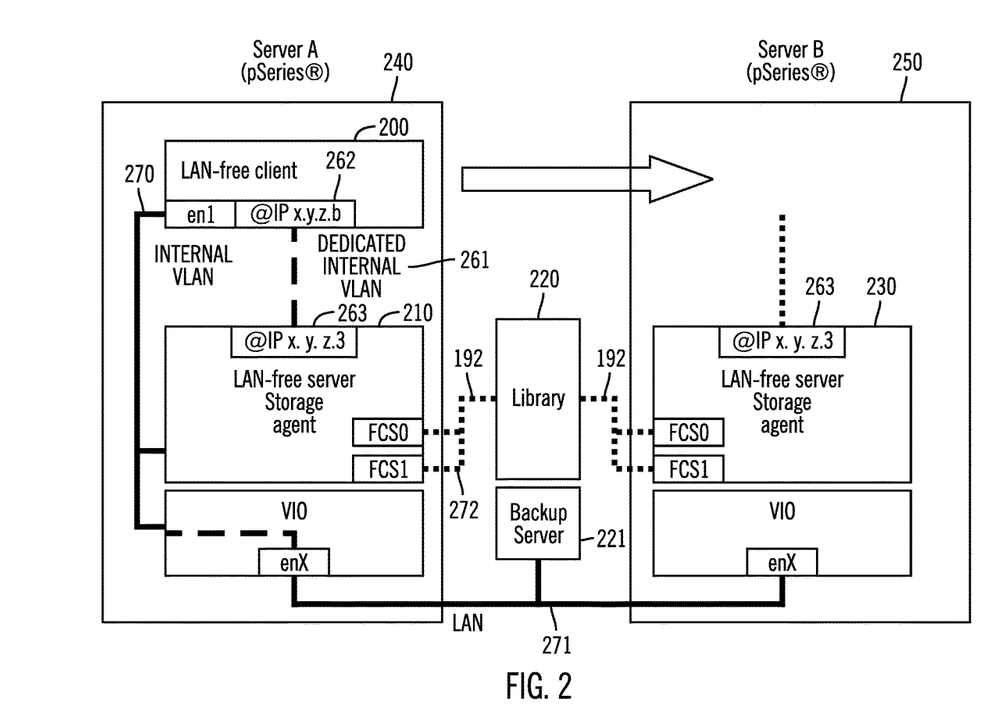
FIG. 2 shows the live Partition Mobility design with LAN-free server.

FIG. 2 shows the Live Partition Mobility (LPM) design with LAN-free server. FIG. 2 comprises: a logical partition that hosts a LAN-free backup client 200; a Logical partition that hosts a LAN-free server on the server A 210; a Tape library 220; a Logical partition that hosts a LAN-free server on the server B 230; a Physical server A 240; a Physical server B 250; backup dedicated VLAN used for data transfer 261; a LAN-free client of IP address x.y.z.b, a virtual Ethernet adapter 262; a LAN-free server 263 of IP address x.y.z.3 (for example); a LAN-free client virtual Ethernet adapter 270 linked to the VIO; the Local Area Network (LAN) 271 used for control and protocol streamed by the backup server.

In case of live partition mobility (LPM), any client partition 100 can move online from its IBM pSeries® 240 to the other IBM pSeries® 250 dynamically. Certain embodiments include operations to perform the following:

(i) SAN Tape library access after live partition mobility

When the client partition 100 moves from the first IBM pSeries® 240 to the other IBM pSeries® 250, it can work with the LAN-free server partition 230 owned by the other IBM pSeries®.

As the same IP address is defined on the LAN-free server partition virtual Ethernet 263, the client partition IP address 262 can still communicate with the tape library via the new LAN-free server partition 230.

(ii) Data SAN disks client partition access after live partition mobility

The data SAN disks access is not interrupted during live partition mobility. As each IBM pSeries® server is connected to the same SAN, the Live Partition Mobility (LPM) copies the virtual devices that manage the access to the SAN disks from the source IBM pSeries® VIO partition 130 to the destination IBM pSeries® VIO partition.

(iii) Physical LAN access from client partition after live partition mobility

The physical Local Area Network (LAN) 271 used for control and protocol stream by the backup server 140 keeps connected during the Live Partition Mobility (LPM). As the virtual structures exist on the destination IBM pSeries® and are connected to the same VLANs on the physical switches, the Live Partition Mobility (LPM) connects the client partition 100 to the same VLANs after the move. This means that the same backup server can continue to control the backup or restore operations and the same tape library can also be used after the move.

(iv) LAN-free server partition access via virtual Ethernet LAN after Live Partition Mobility The dedicated VLAN 261 used for data transfer uses the same subnet and the IP address is common for all LAN-free servers 263 hosted by the two physical servers (shown in the drawing as physical server A 240 and as physical server B 250).

After the migration of the logical partition that hosts the LAN-free client 200 from physical server IBM pSeries® A 240 to the physical server IBM pSeries® B 250, the LAN-free client 200 is directly linked to the common IP address of the LAN-free server 263. This configuration avoids any network or devices reconfiguration.

Figure 3:
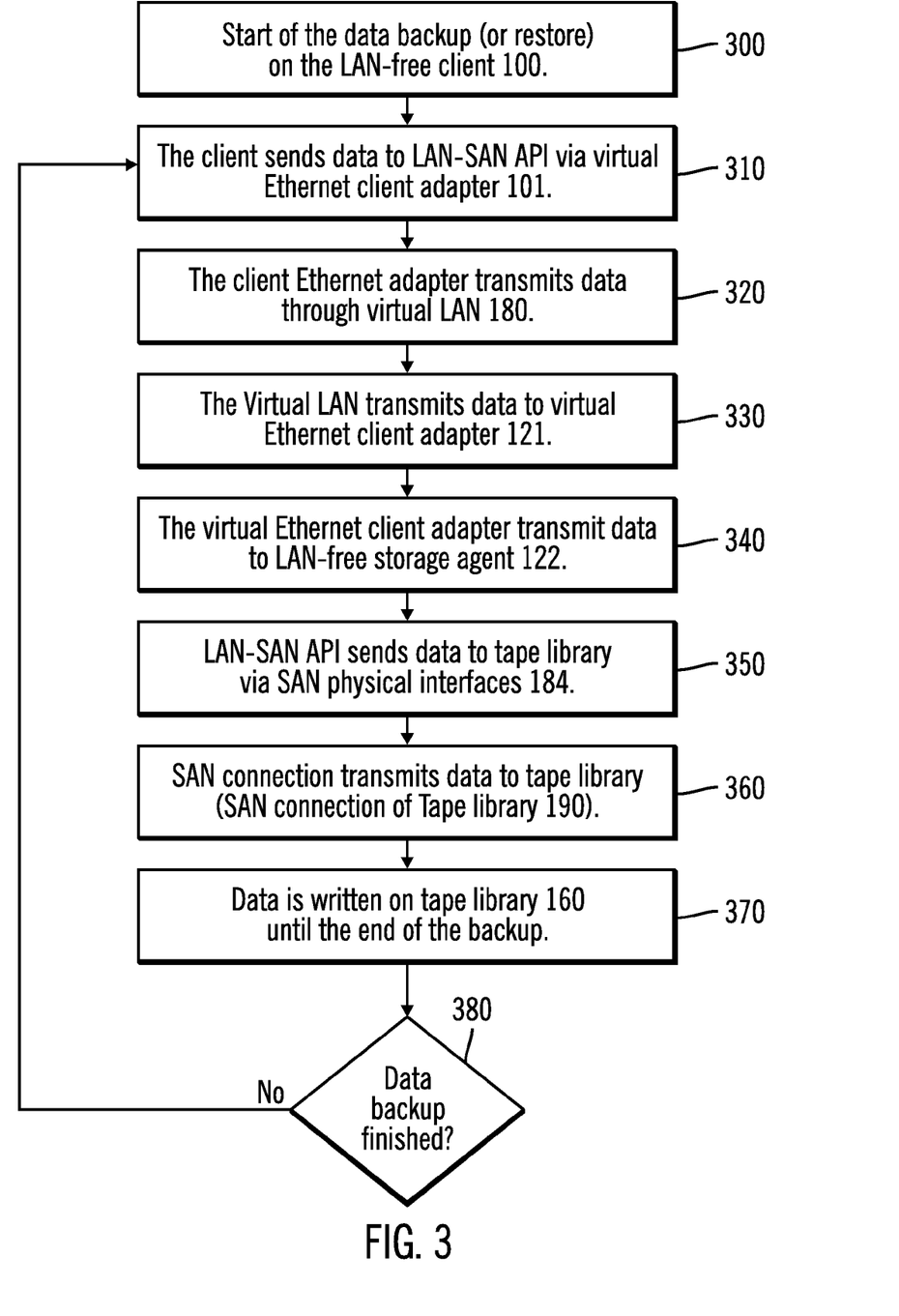
FIG. 3 shows the workflow of the data transfer during a backup or a restore of the data.

FIG. 3 shows the workflow of the data transfer during a backup or a restore of the data. FIG. 3 describes the process of the data transfer from the client partition 100 to the tape library 160 in case of a backup operation of the client data. In case of a restore operation, the process is similar but in the reverse direction.

At step 300, the data backup operation (or restore) is started on the LAN-free client 100.

At step 310, the client sends data to LAN-SAN API via virtual Ethernet client adapter 101.

At step 320, the client Ethernet adapter transmits data through virtual LAN 180.

At step 330, the Virtual LAN transmits data to virtual Ethernet client adapter 121.

At step 340, the virtual Ethernet client adapter transmits data to LAN-free storage agent 122.

At step 350, the LAN-SAN API sends data to tape library via SAN physical interfaces 184.

At step 360, the SAN connection transmits data to tape library (SAN connection of Tape library 190).

At step 370, the data is written on tape library 160 until the end of the backup.

At step 380, if the data backup is not finished, the process returns to step 310.

Figure 4:
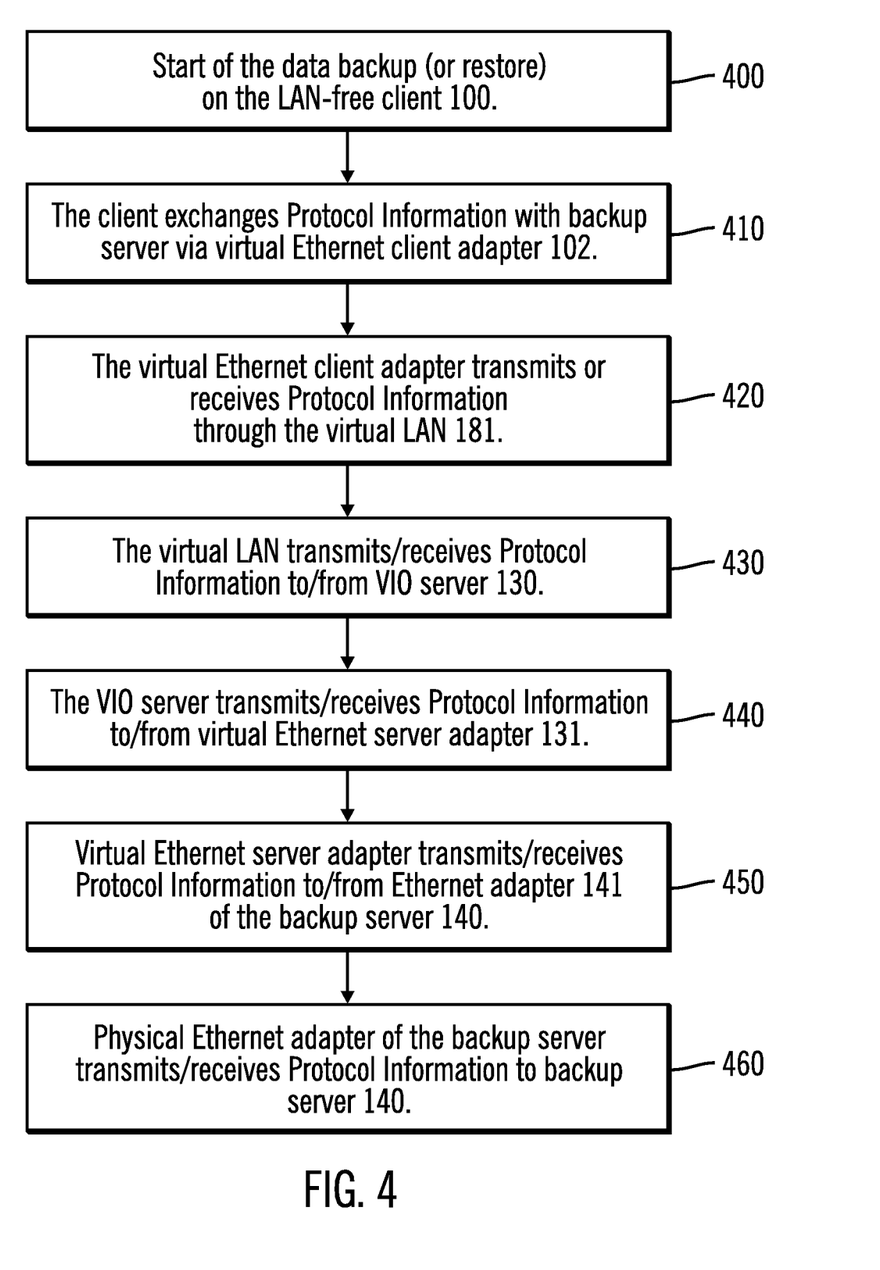
FIG. 4 shows the workflow of the backup/restore protocol information transfer during a backup or a restore of the data.

FIG. 4 shows the workflow of the backup/restore protocol information transfer during a backup or a restore of the data. The workflow shown on FIG. 4 describes the process of backup protocol information exchange between the client partition 100 and the backup server 140 to manage the backup or restore of the data of the client partition 100.

At step 400, the data backup (or restore) is started on the LAN-free client 100.

At step 410, the client exchanges Protocol Information with backup server via virtual Ethernet client adapter 102.

At step 420, the virtual Ethernet client adapter transmits or receives Protocol Information through the virtual LAN 181.

At step 430, the virtual LAN transmits/receives Protocol Information to/from VIO server 130.

At step 440, the VIO server transmits/receives Protocol Information to/from virtual Ethernet server adapter 131.

At step 450, the virtual Ethernet server adapter transmits/receives Protocol Information to/from Ethernet adapter 141 of the backup server 140.

At step 460, the Physical Ethernet adapter of the backup server transmits/receives Protocol Information to backup server 140.

Figure 5:
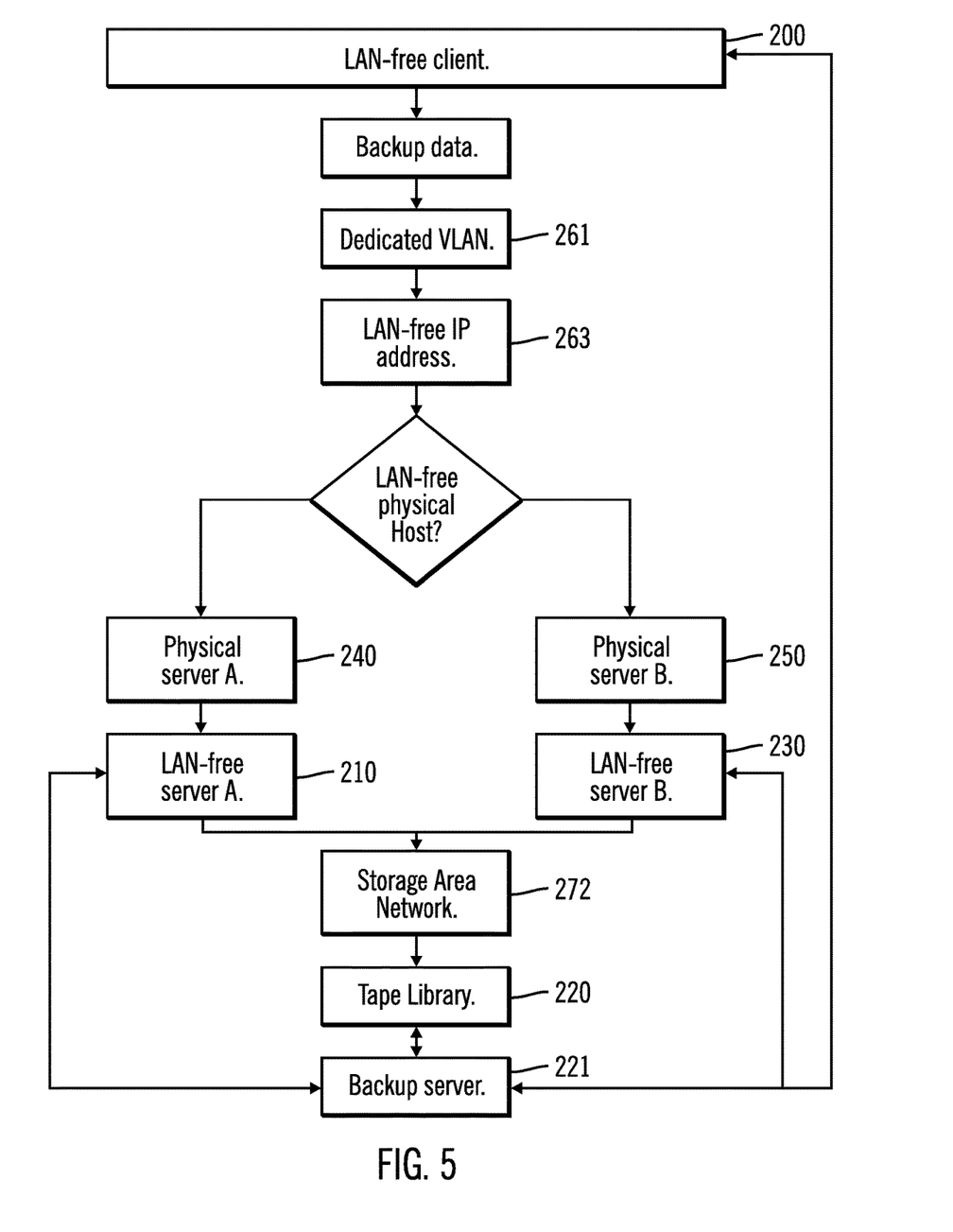
FIG. 5 shows a workflow of a live Partition Mobility operation.

FIG. 5 shows a workflow of a live Partition Mobility operation.

The LAN-free client 200 sends the data of the backup through the dedicated VLAN 261 to the IP address dedicated to the LAN-free servers 263. The LAN-free servers are hosted on different physical servers (in the figure, as physical server A 240 and physical server B 250).

LAN-free servers are attached by Storage Area Network SAN 271 to the Tape library. The LAN-free clients, LAN-free servers and backup server 221 are connected to a Local Area Network LAN 271 providing the control and protocol information.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

Embodiments can thus take form of an entirely hardware embodiment, an entirely software embodiment or an embodiment containing both hardware and software elements. Certain embodiments are implemented in software, which includes but is not limited to firmware, resident software, microcode, etc. In a high performance system, a hardware implementation of the virtualization mechanism bundled with image generation processing may prove advantageous for example.

Furthermore, certain embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

IBM pSeries® is a registered trademark of IBM Corporation

What is claimed is:

1. A method of handling data transfer, the method comprising:
    sending data from at least one client partition of a first server to at least one partition of a LAN-free server through a Local Area Network (LAN) on a TCP/IP protocol, wherein the sending comprises: transmitting the data from a first virtual adapter through a virtual LAN to a second virtual adapter; and transmitting, by the second virtual adapter, the data to a LAN-free storage agent comprising a LAN-SAN Application Programming Interface (API);
    converting, by the LAN-SAN API, the sent data from the TCP/IP protocol into Fibre Channel protocol; and
    sending the converted data to a tape library of a Storage Area Network (SAN) through at least one Fibre Channel card, wherein SAN tape sharing is performed between client partitions via virtualization by sharing Fibre Channel cards coupled to the SAN which is coupled to the tape library, wherein the LAN-free server has the at least one Fibre Channel card shared with the at least one client partition of the first server, wherein the at least one client partition is configured to move dynamically to a second server without reconfiguration of SAN tape drives, and wherein the sending of the data is performed via the virtual LAN of a LAN-free environment.

2. The method of claim 1, wherein the data transfer is performed in the LAN-free environment, and wherein the LAN-free environment comprises:
    the SAN having at least one tape library;
    the LAN-free server having the at least one partition; and
    the first server having the at least one client partition.

3. The method of claim 2, wherein the LAN-SAN API acts as a gateway.

4. The method of claim 2, wherein the LAN-free environment further comprises a backup server coupled to the client partition, and wherein the backup server initiates the data transfer.

5. The method of claim 1, wherein no Fibre Channel cards are installed on each of the client partitions.

6. A system for handling data transfer, the system comprising:
    a first server; and
    a LAN-free server coupled to the first server, wherein the system performs operations, the operations comprising:
    sending data from at least one client partition of a first server to at least one partition of a LAN-free server through a Local Area Network (LAN) on a TCP/IP protocol, wherein the sending comprises: transmitting the data from a first virtual adapter through a virtual LAN to a second virtual adapter; and transmitting, by the second virtual adapter, the data to a LAN-free storage agent comprising a LAN-SAN Application Programming Interface (API);
    converting, by the LAN-SAN API, the sent data from the TCP/IP protocol into Fibre Channel protocol; and
    sending the converted data to a tape library of a Storage Area Network (SAN) through at least one Fibre Channel card, wherein SAN tape sharing is performed between client partitions via virtualization by sharing Fibre Channel cards coupled to the SAN which is coupled to the tape library, wherein the LAN-free server has the at least one Fibre Channel card shared with the at least one client partition of the first server, wherein the at least one client partition is configured to move dynamically to a second server without reconfiguration of SAN tape drives, and wherein the sending of the data is performed via the virtual LAN of a LAN-free environment.

7. The system of claim 6, wherein the data transfer is performed in the LAN-free environment, and wherein the LAN-free environment comprises:
    the SAN having at least one tape library;
    the LAN-free server having the at least one partition; and
    the first server having the at least one client partition.

8. The system of claim 7, wherein the LAN-SAN API acts as a gateway.

9. The system of claim 7, wherein the LAN-free environment further comprises a backup server coupled to the client partition, and wherein the backup server initiates the data transfer.

10. The system of claim 6, wherein no Fibre Channel cards are installed on each of the client partitions.

11. A non-transitory computer readable medium for handling data transfer having encoded thereon a computer program, when said computer program is executed on a suitable computer to perform operations, the operations comprising:
    sending data from at least one client partition of a first server to at least one partition of a LAN-free server through a Local Area Network (LAN) on a TCP/IP protocol, wherein the sending comprises: transmitting the data from a first virtual adapter through a virtual LAN to a second virtual adapter; and transmitting, by the second virtual adapter, the data to a LAN-free storage agent comprising a LAN-SAN Application Programming Interface (API);
    converting, by the LAN-SAN API, the sent data from the TCP/IP protocol into Fibre Channel protocol; and sending the converted data to a tape library of a Storage Area Network (SAN) through at least one Fibre Channel card, wherein SAN tape sharing is performed between client partitions via virtualization by sharing Fibre Channel cards coupled to the SAN which is coupled to the tape library, wherein the LAN-free server has the at least one Fibre Channel card shared with the at least one client partition of the first server, wherein the at least one client partition is configured to move dynamically to a second server without reconfiguration of SAN tape drives, and wherein the sending of the data is performed via the virtual LAN of a LAN-free environment.

12. The non-transitory computer readable medium of claim 11, wherein the data transfer is performed in the LAN-free environment, and wherein the LAN-free environment comprises:

the SAN having at least one tape library;
the LAN-free server having the at least one partition; and
the first server having the at least one client partition.

13. The non-transitory computer readable medium of claim 12, wherein the LAN-SAN API acts as a gateway.

14. The non-transitory computer readable medium of claim 12, wherein the LAN-free environment further comprises a backup server coupled to the client partition, and wherein the backup server initiates the data transfer.

15. The non-transitory computer readable medium of claim 11, wherein no Fibre Channel cards are installed on each of the client partitions.

* * * * *